United States Patent [19]

Frey

[11] 3,908,384

[45] Sept. 30, 1975

[54] BREAKWATERS FOR LONG, SHORT AND/OR COMPLEX WATER WAVES

[75] Inventor: Kurt P. H. Frey, Newark, Del.

[73] Assignee: Sigrid F. Balekjian, Arcadia, Calif. ; a part interest

[22] Filed: Sept. 14, 1973

[21] Appl. No.: 397,535

[52] U.S. Cl. .............................. 61/4; 61/5
[51] Int. Cl.² .............................. E02B 3/06
[58] Field of Search .................. 61/4, 5, 6, 3, 2

[56] References Cited
UNITED STATES PATENTS

| | | | |
|---|---|---|---|
| 2,584,867 | 2/1952 | Guarin | 61/5 |
| 2,920,454 | 1/1960 | Wolf | 61/4 |
| 2,967,398 | 1/1961 | Smith | 61/5 |
| 3,022,632 | 2/1962 | Parks | 61/3 |
| 3,085,404 | 4/1963 | Smith | 61/5 |
| 3,415,061 | 12/1968 | Staempeli | 61/4 |
| 3,785,159 | 1/1974 | Hammond | 61/2 |
| 3,791,150 | 2/1974 | Taemii | 61/5 |

OTHER PUBLICATIONS

Breakwater Studies in Wave Tanks by Kurt P. H. Frey, Technical Report, No. 14, July 1972 CMS No. 2LN055.

*Primary Examiner*—Paul R. Gilliam
*Assistant Examiner*—Alex Grosz
*Attorney, Agent, or Firm*—Hall & Myers

[57] ABSTRACT

This invention relates to a breakwater, expecially for use where a large range of wavesteepness (i.e., ratio of wave height to wave length) is encountered, such as in coastal regions of oceans and large lakes. This new breakwater is a composite device and comprises two different kinds of breakwaters. The component located first in the path of approaching waves is a breakwater particularly adapted to dampen waves of large wave steepness by creating numerous starting and stopping vortices. This first breakwater may take the form of a series of vanes at different depths. The second breakwater in the path of the approaching waves is adapted to dampen waves of a large range of wave steepness. This second type of wavebreaker is preferably a curved plate with the convex side up as viewed from above, and is preferably in the form of a continuous surface. These two types of breakwaters have now been coordinated to create mutual interaction such that the first breakwater reduces wave energy sufficiently so that the second type of breakwater can safely complete the desired wave attenuation, even in stormy weather.

10 Claims, 4 Drawing Figures

BREAKWATERS FOR LONG, SHORT AND/OR COMPLEX WATER WAVES

BACKGROUND OF THE INVENTION

Breakwaters for dampening ocean waves to protect ships, shore areas, and the like are well known. In general, however, they fail to be completely effective since they fail to adequately dampen all components or types of ocean waves. Ocean waves include relatively long waves, or relatively short waves, or both. Moreover, a relatively long wave may itself include components made up of short waves, in a manner analogous to the fact that a low pitch musical tone may include a number of high pitch harmonics. In addition, water waves are often the result of the wind, and as wind changes in strength and direction, so do the waves.

Since the prior art breakwater arrangements fail to properly take in to account the character of the different waves encountered thereby, they do not act efficiently on all the waves and/or components of the waves involved and therefore must be made complex, such as by repetition of inefficient structures, to achieve adequate results.

It is, therefore, a primary object of the invention to provide a breakwater that will efficiently dampen a wide variety of different waves.

Another object of the invention is to provide a simple structure that may be easily moved to the desired location.

Another object of the invention is to provide a breakwater that is effective in operation yet low in cost.

Other objects of the invention will appear as this description proceeds.

SUMMARY OF THE INVENTION

The breakwater of this invention comprises a first breakwater section that is adapted to dampen relatively short waves and/or short components of a long wave. After the wave has passed this first section it encounters the second section which is adapted to dampen long waves. The second section can effectively do this because the first section acts as a primary wave control method. Sufficient amounts of energy have been eliminated before the transmitted wave reaches the second section. Hence, the second section may act as a secondary control at reduced hydraulic load eliminating support problems more adequately also.

The first section may, in its preferred form, comprise a series of vanes the first of which is substantially below water level. The subsequent vanes are progressively higher until at least one is near to or above water level, and then one or more further vanes are positioned at one or more lower levels until the last one is again substantially below water level. Following the first section, and spaced downstream thereof a suitable or optimum distance, is the second section. In the preferred form of the invention, it may be a curved plate having its leading edge substantially below water level and curving upward in a convex (viewed from a position above the breakwater) manner to a position substantially above the water level.

DETAILED DESCRIPTION OF THE PREFERRED FORM OF THE INVENTION

Figure 1:
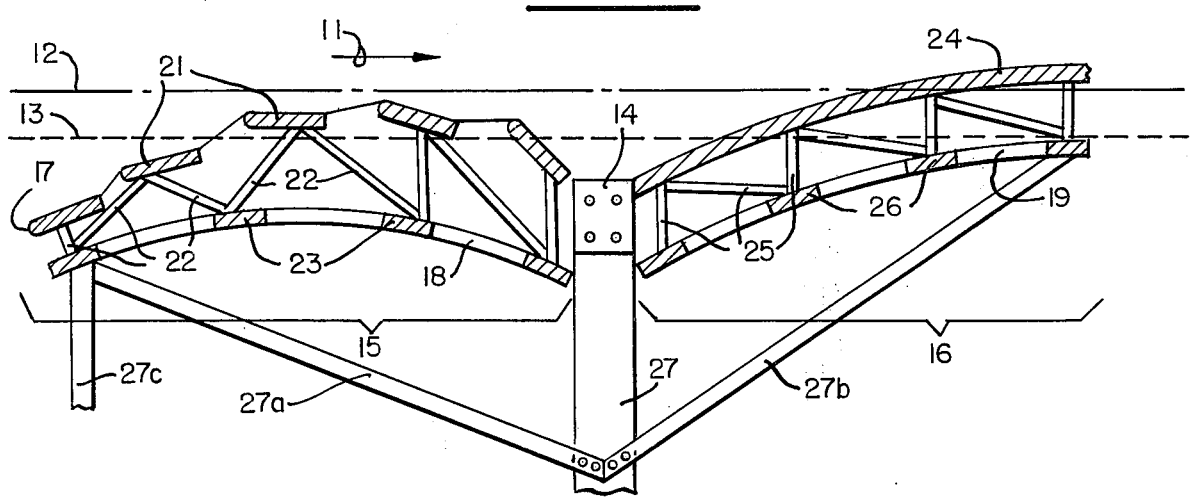
FIG. 1 is a vertical cross-section of the breakwater of the invention.
Figure 2:
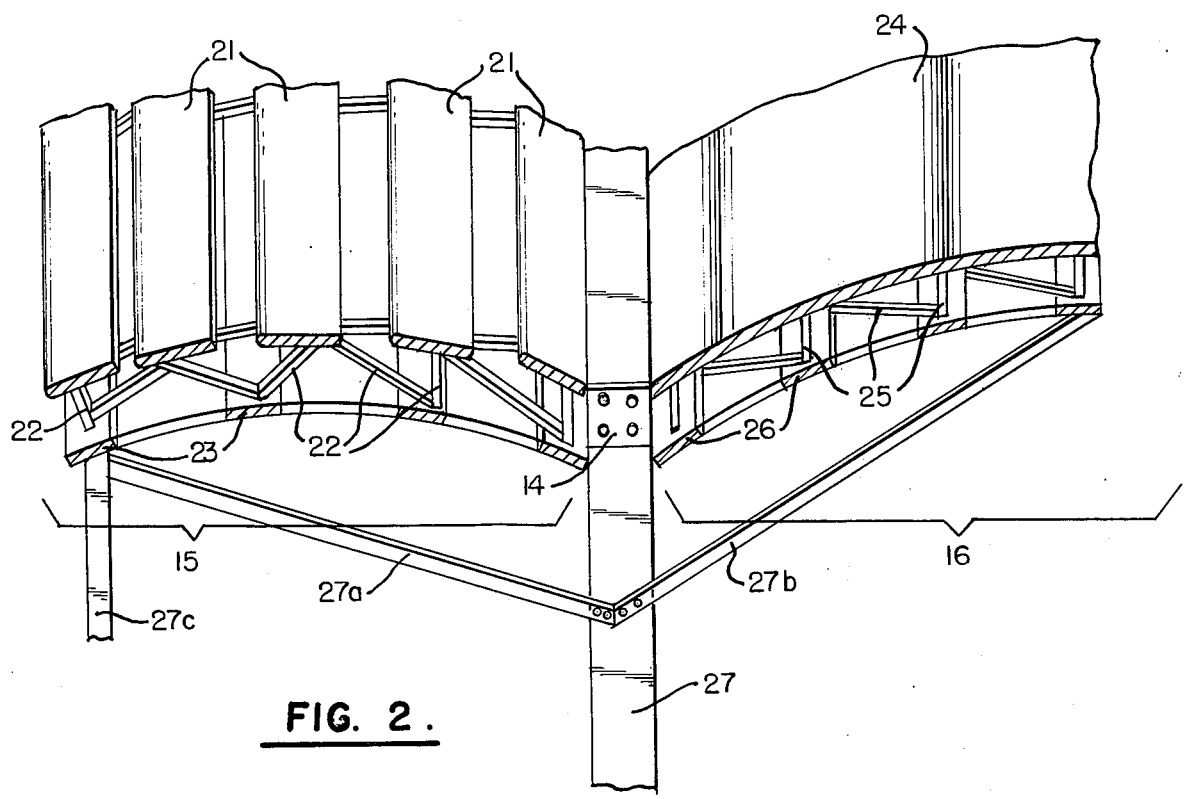
FIG. 2 is a perspective view of the breakwater of FIG. 1.

The breakwater of this invention is adapted to be located in the ocean, or other body of water, to dampen waves approaching the breakwater from one principal direction varying approximately ± 30°. In FIG. 1 it is assumed that the waves to be dampened approach in the direction 11. The high and low levels of calm water are, respectively, shown by lines 12 and 13. The entire apparatus may be supported in its proper positions relative to levels 12 and 13 by a suitable support which may, for example, be posts 27 extending to the floor of the ocean. Braces such as 27a, 27b and additional posts 27c are to be employed as necessary for support of the apparatus. Alternatively, the apparatus may be supported by flotation and mooring cables, or by any floating object.

The first section 15 comprises a series of vanes and has its leading edge 17 in the path of the approaching waves. The first section has a series of vanes that produce many starting and stopping vortices and is therefore effective in dampening the waves. The second, or transmission flow redistributing section 16 follows the first section. Hydrofoil concepts adapted to wave-motion are utilized in both sections 15 and 16.

The working parts of the first section comprise a series of vanes 21 each having its leading edge parallel to the surface of the water (assuming calm water) and perpendicular to the path 11 of the oncoming ocean waves. Five vanes are shown, although more or fewer may be employed. The first vane is shown substantially below water level. The next three vanes are not in tandem arrangement but rather are negatively staggered in such a way that the leading edge of each successive vane is higher than the trailing edge of the preceding vane. The second and third of these three vanes are very near to or above water level. The final vane 21 of the first section 15 may be below water level.

While a specific arrangement of vanes has been shown and described, it is understood that if a vane-type of discontinuous surface is employed in the first section, the primary criteria are that there should be back and forth water movement between the vanes with resulting vortices, at the wavelengths to be dampened.

The second section 16 comprises a single convex surface 24 (viewed from above) having its leading edge parallel to water level and perpendicular to the oncoming waves. The curved surface 24 may be the upper side of a plate of any suitable material. It curves slowly upward to its trailing edge which is preferably above water level.

The vanes 21 and the curved surface 24 are supported by any suitable structure, for example the structure shown. That structure includes supporting elements 18 having cross-ribs 23 and supporting posts 22 for holding the vanes 21 in place. Similarly, the curved surface 24 is supported by supporting elements 19 strengthened by cross-ribs 26 and connected to the surface 24 by posts 25.

The distance between the trailing edge of the last vane 21 of the first section 15 and the leading edge of the surface 24 of the second section 16 may be varied both horizontally and vertically. For satisfactory results, the leading end of the second section 16 should be spaced from the trailing end of the first section 15 by no more than the chord length of section 15 plus the chord length of section 16. Of course, satisfactory results may also be obtained if the distance between sections 15 and 16 does not exceed the longer of those two sections. The space between sections may contain only necessary connecting supports 14, if any, or may include some third wave dampening device.

The first breakwater 15 has its optimum effect with low coefficients of transition at the higher range of wavesteepness; and there is a rapid increase in the coefficient of transition for decreasing wavesteepness. The second breakwater 16 is in the path of the water waves, after they have passed the region of first breakwater 15, and is for dampening water waves, with its optimum effect at the higher range of wavesteepness with a slow increase of the coefficient of transition for decreasing wavesteepness. It follows that the first breakwater 15 possesses greater efficiency in the range of higher values of wavesteepness than the second breakwater 16. Moreover, the first breakwater 15 possesses lower efficiency in the range of lower values of wavesteepness than the second breakwater 16. Hence the mutual interaction of the first and the second breakwaters 15 and 16 assures best overall performance in the sense of admissible coefficients of transition over a large range of values of wavesteepness. There is also the important result of attaining a favorable distribution of the hydraulic load that is due to the impact of the waves. Thus, less structural supporting elements are required than were required heretofore.

Figure 3:
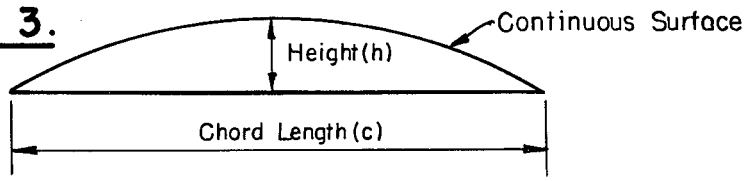
FIG. 3 shows the height ($h$) and the chord length ($c$) of a breakwater.

FIG. 3 illustrates the height ($h$) and the chord length ($c$) of a breakwater. The particular breakwater shown has not only a continuous surface but also a constant rate of curvature. For such a breakwater one desirable relationship of the parts is $h/c = 0.1$.

Figure 4:
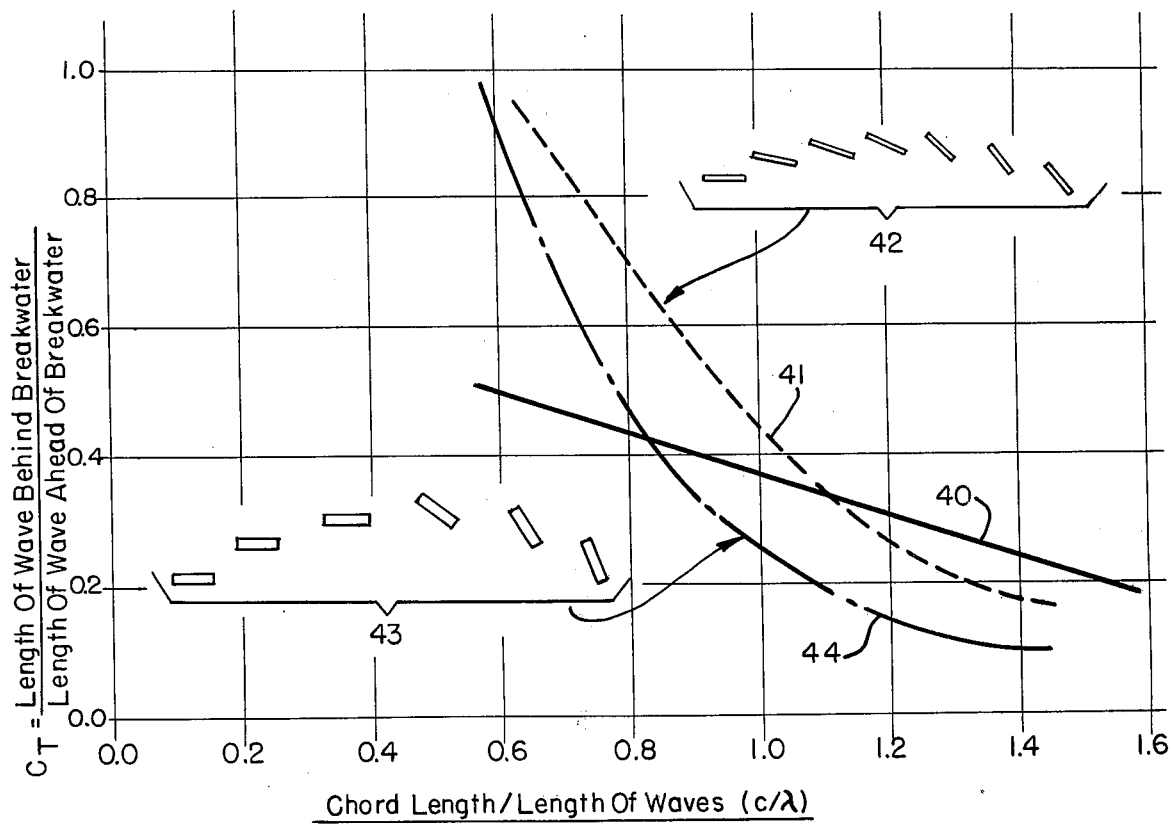
FIG. 4 is a graph showing the effect of different types of breakwaters upon different waves.

FIG. 4 shows that the breakwater 15 has its optimum effect on waves of a different type from those upon which breakwater 16 has its optimum effect. In this figure the y-axis shows the coefficient of transmission $C_T$ of the wave, and is graduated from 0, representing maximum dampening, to 1.0, representing no dampening. The coefficient of transmission $C_T$ is the ratio of the length of the wave behind the breakwater to the length of the wave ahead of the breakwater. The x-axis is graduated from 0 to 1.6, representing the chord length of the breakwater divided by the length of the waves, or $c/\lambda$.

Curves 40, 41 and 44 represent data taken on small models of breakwaters operating in a test tank.

Curve 40 is essentially a straight line showing the effect of a breakwater such as 16, or alternatively such as that shown in FIG. 3. This curve demonstrates that a continuous breakwater, under the particular conditions of the tests, has decreased dampening effect on the water as its length is increased. Moreover, its dampening effect is reduced as the wavelength increases. This condition is of course applicable under only limiting operating conditions, but is illustrative of the effect of an actual full-size breakwater operating in a large body of water.

Curve 41 illustrates the dampening effect as compared to $c/\lambda$, for a breakwater comprising a series of vanes 42. However, if the breakwater is in the form of boxes such as breakwater 43, the curve 44 is applicable.

The invention of this case is based on the fact that a composite breakwater, in which one section is composed of a series of vanes 42, or a series of boxes 43, or the like, and in which the other section is composed of a continuous surface (as in FIG. 3 for example), has a greater dampening effect than a single breakwater of the same total length, and also has a greater dampening effect than the sum of the dampening effects of the two sections individually.

Stated in another way, the first breakwater 15 is especially adapted to dampen strong steep waves, and the second breakwater 16 is adapted to dampen waves throughout a wide range of wave steepnesses.

Each point along each of curves 40, 41, and 44 represents one value of wave steepness:

$$\text{wave steepness} = \frac{\text{wave height (wh)}}{\text{wave length (wl)}} = \frac{h}{\lambda}$$

Each value of wave steepness belongs to all of those numerous waves which possess the same ratio of $$\frac{wh}{wl} = \frac{h}{\lambda}.$$

It is, of course, desirable to utilize breakwaters with short chord lengths for economical reasons. The present invention teaches how this may be done effectively.

When waves are referred to herein as "long" it is understood that reference is made to waves, of the body of water in which the breakwater is to be used, which are longer than waves of average length. Similarly, when other words such as "strong" and "steep" are used to describe the waves, it is understood that the datum of comparison is the average waves which are encountered. Thus, strong waves are those of above average force, and steep waves are waves that are steeper than average.

While a typical design of my composite breakwater of a new type of hermaphrodite breakwater system has been shown and described, it is understood that I am not limited thereby so far as the broader aspects of the invention are concerned.

I claim to have invented:

1. A breakwater for dampening water waves having a front part that receives the approaching crests of the oncoming water waves and a rear part, comprising:
   first breakwater means comprising a series of discrete wave deflecting elements spaced at different locations along and normal to the direction of travel of the crests of the principal waves and at least at two depths and positioned to direct at least some of the water that passes under at least one element and over at least one other element, to produce vortices adjacent the elements and dampen the waves passing the elements,
   second breakwater means, for dampening water waves, and which is a substantially continuous breakwater that has its leading end below water level and extends upwardly and rearwardly for a substantial distance,
   supporting means for, and operatively coordinating, said first and second breakwater means, said supporting means positioning the first breakwater means ahead of the second breakwater means and with the rear end of the first breakwater means within a distance of the front end of the second breakwater means not greater than the combined chord lengths of the first and second breakwater means so that the first and second breakwater means cooperate with each other to provide dampening of a wider range of wavesteepnesses than either breakwater means alone provides.

2. A breakwater for dampening water waves as defined in claim 1 in which said elements include at least two vanes that have front and rear edges and generally horizontal upper and lower faces.

3. A breakwater as defined in claim 2 in which at least one of the leading vanes of the series has its rear end at a higher level than its front end and at least one of the vanes adjacent the rear end of the first breakwater means has its forward end at a higher level than its rear end.

4. A breakwater for dampening water waves as defined in claim 1 in which the second breakwater means is a continuous surface the rear end of which is above water level.

5. A breakwater as defined in claim 1 in which said elements are elongated bodies having upper and lower faces, which faces are generally transverse to the vertical direction, and in which the front end of the second breakwater means is rearward of the rear end of the first breakwater means.

6. A breakwater as defined in claim 5 in which the depth, below water level, of the forwardmost body of the first breakwater means is greater than the depth of at least one of the more rearward bodies of the first breakwater means.

7. A breakwater as defined in claim 6 in which the depth, below water level, of at least part of the rearwardmost body of the first breakwater means is greater than the depth of at least one of the preceding bodies of the first breakwater means.

8. A breakwater as defined in claim 1 in which the distance between the rear end of the first breakwater means and the front end of the second breakwater means does not exceed the length of the longer one of the two breakwater means, the front end of the second breakwater means being at a greater depth below water level than the rear end of the first breakwater means.

9. A breakwater for dampening water waves having a front part that receives the approaching crests of the oncoming water waves and a rear part, comprising:

first breakwater means comprising a series of at least two discrete wave deflecting elements spaced at different locations along and normal to the direction of travel of the crests of the principal waves and at least at two depths and positioned to direct at least some of the water that passes under at least one element over at least one other element, to produce vortices adjacent the elements and dampen the waves passing the elements, second breakwater means which is a substantially continuous breakwater that has a leading portion below water level, extends upwardly and rearwardly for a substantial distance, and has a chord length at least as great as the chord length of two of said elements as measured from the leading edge of the first to the trailing edge of the last of the two elements, to thereby provide a breakwater having its greatest efficiency in a different range of wave steepnesses than the range over which the first breakwater means has its greatest efficiency, and mounting means for the first and second breakwater means to position said elements of the first breakwater means forward of the second breakwater means to thereby dampen the wavefronts that fall in the range over which the first breakwater means has its greatest efficiency before the waves reach the second breakwater means to thus improve the efficiency of the second breakwater means, said mounting means including frame means for holding said elements as well as said second breakwater means in a substantially fixed relationship to each other and also including means for preventing substantial movement of the first and second breakwater means in response to the forces of the waves.

10. A breakwater as defined in claim 9 in which the distance between the rear end of the first breakwater means and the front end of the second breakwater means does not exceed the length of one of the breakwater means.

* * * * *

UNITED STATES PATENT AND TRADEMARK OFFICE
CERTIFICATE OF CORRECTION

PATENT NO. : 3,908,384
DATED : September 30, 1975
INVENTOR(S) : Kurt P. H. Frey

It is certified that error appears in the above-identified patent and that said Letters Patent are hereby corrected as shown below:

In the drawings, Sheet 2, Figure 4, along the y-axis, delete "Length", both occurrences, and insert ---Height---. Column 3, line 47, delete "length", both occurrences, and insert ---height---. Column 4, lines 18-22, delete the rightmost equality "$\frac{h}{\bar{\lambda}}$" in the equation and insert:

$$\frac{H}{\bar{\lambda}}$$

Column 4, lines 25-29, delete the rightmost equality "$\frac{h}{\bar{\lambda}}$" in the equation and insert:

$$\frac{H}{\bar{\lambda}}$$

Signed and Sealed this twenty-seventh Day of January 1976

[SEAL]

Attest:

RUTH C. MASON
*Attesting Officer*

C. MARSHALL DANN
*Commissioner of Patents and Trademarks*